United States Patent [19]
Beeson et al.

[11] Patent Number: 6,010,747
[45] Date of Patent: Jan. 4, 2000

[54] PROCESS FOR MAKING OPTICAL STRUCTURES FOR DIFFUSING LIGHT

[75] Inventors: Karl Beeson, Princeton; Scott Zimmerman, Basking Ridge; Jose Diaz, Lodi; Mac Maxfield, Teaneck, all of N.J.

[73] Assignee: AlliedSignal Inc., Morris Township, N.J.

[21] Appl. No.: 08/759,338

[22] Filed: Dec. 2, 1996

[51] Int. Cl.[7] ............... C08F 2/46; B05D 5/06; B05D 5/02; C08J 7/04

[52] U.S. Cl. ............ 427/162; 427/164; 427/492; 427/495; 430/321; 264/119

[58] Field of Search ............ 428/412, 687, 428/426; 359/599; 430/270, 290, 324, 311, 321, 322, 4; 427/256, 487, 492, 495, 508, 532, 553, 554, 163.1, 163.2, 164, 163.4, 165, 169; 385/38; 522/6; 362/32; 264/1.27, 119, 1.37, 509; 459/69

[56] References Cited

U.S. PATENT DOCUMENTS

| | | | |
|---|---|---|---|
| 3,218,024 | 11/1965 | Kroekel | 251/58 |
| 3,279,314 | 10/1966 | Miller | 88/28.93 |
| 4,368,245 | 1/1983 | Bayer et al. | 430/321 |
| 4,436,806 | 3/1984 | Rendulic et al. | 430/311 |
| 4,567,123 | 1/1986 | Ohtaka et al. | 430/264 |
| 4,573,764 | 3/1986 | Bradley | 350/127 |
| 4,605,283 | 8/1986 | Stanton | 350/127 |
| 4,660,930 | 4/1987 | van der Hoorn et al. | 350/126 |
| 4,682,853 | 7/1987 | Broer et al. | 350/128 |
| 4,688,093 | 8/1987 | van der Staak et al. | 350/126 |
| 4,692,359 | 9/1987 | Fitzpatrick | 427/126 |
| 4,701,019 | 10/1987 | Fitzpatrick | 359/453 |
| 4,725,448 | 2/1988 | Fitzpatrick | 427/126 |
| 4,920,039 | 4/1990 | Fotland et al. | 430/324 |
| 5,108,857 | 4/1992 | Kitayama et al. | 430/14 |
| 5,112,722 | 5/1992 | Tsujino et al. | 430/290 |
| 5,396,350 | 3/1995 | Beeson et al. | 359/40 |
| 5,428,468 | 6/1995 | Zimmerman et al. | 359/40 |
| 5,462,700 | 10/1995 | Beeson et al. | 264/1.27 |
| 5,481,385 | 1/1996 | Zimmerman et al. | 359/40 |
| 5,739,931 | 4/1998 | Zimmerman et al. | 359/40 |

FOREIGN PATENT DOCUMENTS

WO 95/03935  2/1994  European Pat. Off. .
WO 95/04303  2/1994  European Pat. Off. .

*Primary Examiner*—John J. Zimmerman
*Assistant Examiner*—Michael LaVilla
*Attorney, Agent, or Firm*—John A. Squires; Colleen D. Szuch

[57] ABSTRACT

Optical diffusing structures can be fabricated from photopolymerizable material by directing light through a transparent or translucent substrate and then through the photopolymerizable material for a period of time sufficient to photopolymerize only a portion of the material. The resultant structure can be utilized as a diffuser, a viewing screen, and in other applications, and can be combined with other light-directing structures such as arrays of tapered optical waveguides.

22 Claims, 13 Drawing Sheets

LIGHT

PROCESS FOR MAKING OPTICAL STRUCTURES FOR DIFFUSING LIGHT

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, a diffuser of this type suffers from two major drawbacks: a high degree of backscattering and the need for air contact. Backscattering causes reflection of a significant portion of the light back to the originating source when it should properly pass through the diffuser, lowering the efficiency of the optical system. The second drawback, the requirement that the rough surface must be in contact with air to operate properly, may also result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where an embedded diffuser may be desirable, where the first type of diffuser would not be appropriate. For example, a diffuser layer could be embedded between the output polarizer layer and an outer hardcoat layer of a liquid crystal display system to protects the diffuser from damage. Additionally, a diffuser having a thin profile, which will retain wide optical scattering power when embedded in other materials and have low optical backscatter and therefore higher optical efficiencies than conventional diffusers, would be highly desirable.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

A light diffuser can be fabricated from a film of photopolymerizable material by directing collimated or nearly-collimated light through a substrate of a transparent or translucent material and into the photopolymerizable material. Collimated light may be defined as that light where the divergence angle of the light rays is less than 0.5 degrees. By contrast, the divergence angle of the light rays in nearly-collimated light is less than ±10 degrees, preferably less than ±5 degrees, and more preferably less than ±3.5 degrees. In this application, whether collimated or nearly-collimated, the light is preferably incoherent, i.e., light that does not have a uniform phase. Most light sources (with the exception of laser light sources) such as arc lamps, incandescent lamps, or fluorescent lamps produce incoherent light, although coherent light may also be utilized.

The photopolymerizable material is exposed to the light for a period of time sufficient to crosslink (or polymerize) only a portion of the material. After this has occurred, the non-crosslinked portion of the material is removed, leaving a highly-modulated surface on the photopolymerized portion. This remaining structure can be employed directly as a diffuser or it may used to create a metallic replica for embossing another material to create a diffuser.

The Substrate Material

Suitable materials for the substrate include (a) optically clear, transparent materials; (b) semi-clear, transparent materials with some haze or light scattering due to inhomogeneities in the composition or the structure of the material; and (c) translucent materials. Suitable materials for the substrates may also be classified by their crystallinity and include (a) amorphous materials; (b) semi-crystalline materials that contain crystalline domains interspersed in an amorphous matrix; and (c) purely crystalline materials. Although such materials can be organized according to the three preceding classifications, it should be noted that the crystallinity of many polymers suitable for this application can change depending on how the polymer is manufactured. Therefore, a given substance may fall within one or more of those classes. The substrate typically has two opposing flat surfaces generally parallel to each other, but other configurations could be employed.

Materials meeting the criteria of the foregoing paragraph include inorganic glasses such as borosilicate glass and fused silica; amorphous polymers such as cellulose acetate, cellulose triacetate, cellulose butyrate, ethylene-vinyl alcohol copolymers such as polyvinyl alcohol, polymethyl methacrylate, and polystyrene; and semi-crystalline polymers include polyesters, nylons, epoxies, polyvinyl chloride, polycarbonate, polyethylene, polypropylene, polyimides, and polyurethanes. Of the foregoing semi-crystalline polymers, polyester in a film is preferable and polyethylene terephthalate (PET) (a polyester) was found to be the most preferable choice for the substrate. All of the materials set forth in this paragraph are commercially available.

The Photopolymerizable Material

The photopolymerizable material is comprised of at least three essential ingredients: a photopolymerizable component, a photoinitiator, and a photoinhibitor. The first essential ingredient, a photopolymerizable component, can be a photopolymerizable monomer or oligomer, or a mixture of photopolymerizable monomers and/or oligomers. Commercially-available photopolymerizable monomers and oligomers suitable for this application include (a) epoxy resins such as bisphenol A epoxy resins, epoxy cresol novolac resins, epoxy phenol novolac resins, bisphenol F resins, phenol-glycidyl ether-derived resins, cycloaliphatic epoxy resins, and aromatic or heterocyclic glycidyl amine resins; (b) allyls; (c) vinyl ethers and other vinyl-containing organic monomers; and (d) acrylates and methacrylates such as urethane acrylates and methacrylates, ester acrylates and methacrylates, epoxy acrylates and methacrylates, and (poly)ethylene glycol arylates and methacrylates. Acrylate monomers are described in U.S. Pat. No. 5,396,350, issued Mar. 7, 1995, to Beeson et al., for a Backlighting Apparatus Employing an Array of Microprisms, U.S. Pat. No. 5,428,468, issued Jun. 27, 1995, to Zimmerman et al., for an Illumination System Employing an Array of Microprisms, U.S. Pat. No. 5,462,700, issued Oct. 31, 1995, to Beeson et al., for a Process for Making an Array of Tapered Photopolymerized Waveguides, and U.S. Pat. No. 5,481,385, issued Jan. 2, 1996, to Zimmerman et al., for a Direct View Display with Array of Tapered Waveguides, all of which are incorporated herein by reference.

The following mixtures for the first essential element of the photopolymerizable material have been found to yield acceptable results in increasing order of preference: (a) a mixture of acrylates and epoxy resins; (b) mixtures of aromatic diacrylates and bisphenol A epoxy resins; and (c) a mixture of ethoxylated bisphenol A diacrylate (EBDA) and Dow epoxy resin DER-362 (a polymer of bisphenol A and epichlorohydrin). An example of the last is a mixture of 70 parts by weight of EBDA and 30 parts by weight of Dow epoxy resin DER-362. Other materials can also be used as will readily occur to those skilled in the art. A factor relevant to the selection of the photopolymerizable component is that the cure rate and shrinkage of epoxy resins may differ from that of the acrylate materials.

The second essential ingredient of the photopolymerizable material, a photoinitiator, produces an activated species that leads to photopolymerization of the monomer or oligomer or the mixture of monomers and/or oligomers when it is activated by light. Preferred photoinitiators are disclosed in U.S. Pat. No. 5,396,350, U.S. Pat. No. 5,462,700, and U.S. Pat. No. 5,481,385, cited above. The most preferred photoinitiator is $\alpha,\alpha$-dimethoxy-$\alpha$-phenyl acetophenone (such as Irgacure-651, a product of Ciba-Geigy Corporation). The photoinitiator has been successfully used at a loading level of 2 parts photoinitiator per hundred parts monomer or oligomer material. Preferably, the photoinitiator should be used at a loading level of 0.5-to-10 parts photoinitiator per hundred parts of the monomer or oligomer material, and more preferably at a loading level of 1-to-4 parts photoinitiator per hundred parts monomer or oligomer material.

The third essential ingredient of the photopolymerizable material, an inhibitor, prevents photopolymerization at low light levels. The inhibitor raises the threshold light level for polymerization of the photopolymer so that there will be a distinct boundary between the crosslinked and the non-linked photopolymerizable material instead of a gradient. Various inhibitors are known to those skilled in the art, as described in U.S. Pat. No. 5,462,700 and U.S. Pat. No. 5,481,385, cited above. Oxygen is a preferred inhibitor and is inexpensive. It is readily available if the photopolymerization is performed in the presence of air.

An Arrangement for Photopolymerization

Figure 1:
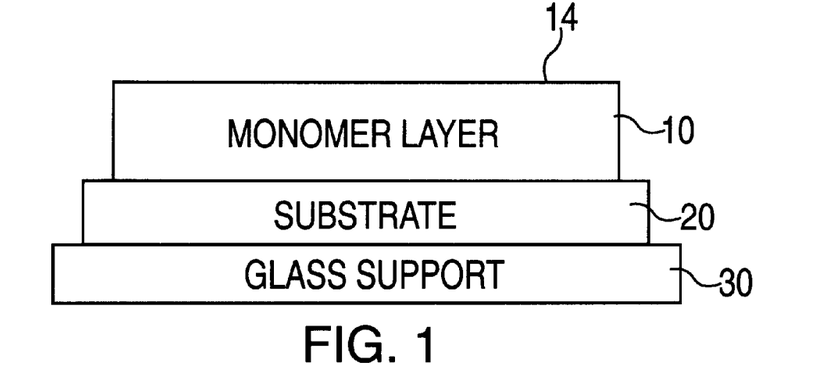
FIG. 1 is a cross-sectional diagram of a layer of photopolymerizable material deposited upon a substrate of transparent material and an optional glass support layer.

As illustrated in FIG. 1, a layer 10 of photopolymerizable material is deposited upon a substrate 20 by any convenient method, such as doctor blading, resulting in a layer of a generally uniform thickness of about 0.02 mm to about 2 mm, preferably of about 0.12 mm to about 0.37 mm, and more preferably a thickness of about 0.2 mm to about 0.3 mm. Satisfactory results have been obtained with a layer of a generally uniform thickness of about 0.2 mm to about 0.3 mm. Optionally, a glass support layer 30 can be placed underneath the substrate 20. Preferably, the top surface 14 of the layer 10 is open to an atmosphere containing oxygen. It should be understood that the elements shown in FIG. 1 and the remaining figures are not to scale; actual and relative dimensions may vary from those shown.

Figure 2:
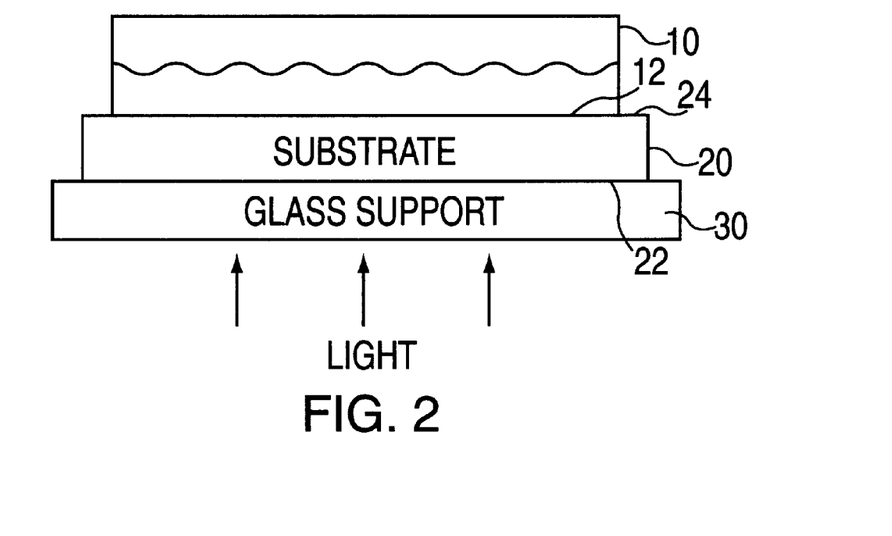
FIG. 2 is a cross-sectional diagram of the layer of photopolymerizable material deposited upon a substrate of transparent material of FIG. 1 where light is directed through the substrate and the photopolymerizable material layer.

Referring to FIG. 2, collimated or nearly-collimated light is directed through the bottom surface 22 of the substrate 20 and through the photopolymerizable layer 10. (If a glass support layer 30 has been provided, the light first passes through the glass.) The light can be any visible light, ultraviolet light, or other wavelengths (or combinations of wavelengths) capable of inducing polymerization of the photopolymerizable material, as will readily occur to those skilled in the art. However, many of the commonly-used photoinitiators, including Irgacure-651, respond favorably to ultraviolet light in the wavelength range from about 350 nm to about 400 nm, although this range is not critical. Preferably, the intensity of the light ranges from about 1 mW/cm$^2$ to about 1000 mW/cm$^2$, more preferably between about 5 mW/cm$^2$ and about 200 mW/cm$^2$, and optimally about 30 mW/cm$^2$, ± about 10 mW/cm$^2$. Satisfactory results have been obtained with a light intensity of approximately 30 mW/cm$^2$.

As light passes through the photopolymerizable layer 10, the molecules of the photopolymerizable material will begin to crosslink (or polymerize), beginning at the bottom surface 12 of the photopolymerizable layer 10 (the top surface 24 of the substrate 20). Before the entire thickness of the photopolymerizable layer 10 has had an opportunity to crosslink, the light is removed, leaving only the lower photocrosslinked polymer component 40 of the photopolymerizable layer 10.

The dosage of light required to achieve the desired amount of crosslinking depends on the photopolymerizable material employed. For example, if the photopolymerizable mixture of EBDA and Dow epoxy resin DER-362 material and the photoinitiator α,α-dimethoxy-α-phenyl acetophenone are used and applied in a thickness ranging from about 0.2 mm to about 0.3 mm, the total light dose received by the photopolymerizable layer 10 preferably ranges from about 5 mJ/cm$^2$ to about 2000 mJ/cm$^2$, more preferably from about 20 mJ/cm$^2$ to about 300 mJ/cm$^2$, and optimally from about 60 mJ/cm$^2$ to about 120 mJ/cm$^2$.

A satisfactory result was obtained using the photopolymerizable mixture of EBDA and Dow epoxy resin DER-362 material. It was applied in a thickness of approximately 0.2 mm to 0.3 mm, together with the photoinitiator Irgacure-651 at a loading level of 2 parts photoinitiator per hundred parts of the photopolymerizable mixture. The light source intensity was approximately 30 mW/cm$^2$ and the dosage was between 60 mJ/cm$^2$ and 120 mJ/cm$^2$.

Removal of the Unphotopolymerized Portion

A developer is then applied to the photopolymerizable layer 10 to remove the unpolymerized portion. The developer can be any material, usually liquid, that will dissolve or otherwise remove the unpolymerized material without affecting the crosslinked component 40. Suitable developers are organic solvents such as methanol, acetone, methyl ethyl ketone (MEK), ethanol, isopropyl alcohol, or a mixture of such solvents. Alternatively, one can employ a water-based developer containing one or more surfactants, as will readily occur to those skilled in the art.

Figure 3:
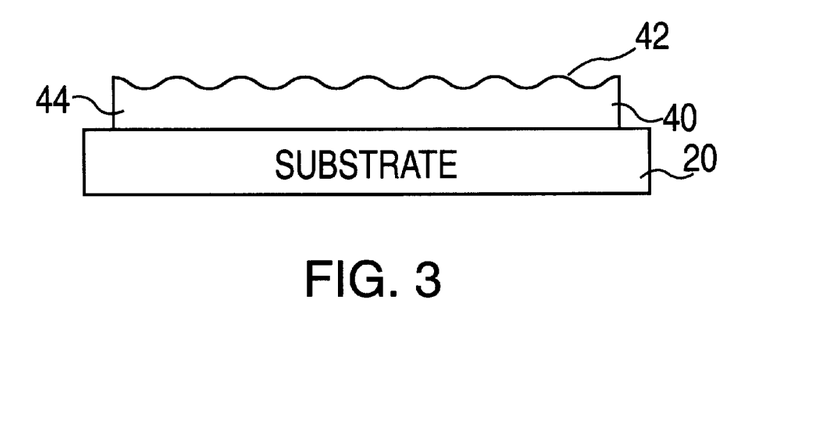
FIG. 3 is a cross-sectional diagram of the substrate of FIG. 2, where the non-crosslinked photopolymerizable material and the glass support layer have been removed.

After the unpolymerized portion had been removed, the photocrosslinked component 40 remains on the substrate 20, as shown in FIG. 3. If desired, the photocrosslinked component 40 can be removed from the substrate 20.

The Highly-Modulated Surface

The surface 42 of the photocrosslinked component 40 is highly modulated, exhibiting smooth bumps ranging in size from about 1 micron to about 20 microns in both height and width. The aspect ratios, i.e., the ratios of the heights to the widths, of the bumps on the highly modulated surface 42 of the photocrosslinked component 40 are generally quite high. Since the substrate is optically clear or semi-clear to the unaided human eye and has no obvious masking features to block light transmission, one might not expect the highly-modulated surface 42.

A highly modulated surface can be achieved with substrates fabricated from photopolymerizable material containing only one monomer or oligomer component, or a mixture of such components. These photocrosslinked materials will exhibit variations in the spatial uniformity of polymerization due to random fluctuations in the spatial intensity of the applied light and statistical fluctuations in the microscopic structure of the substrate 20. An example of the latter is the material PET, a semi-crystalline polymer material containing random microscopic crystals interspersed with amorphous polymer. The random microscopic crystals will refract light differently than the surrounding amorphous polymer if the refractive indexes of the two phases are slightly different. Internally, the polymerized component 40 will exhibit striations 44 running through the thickness of the layer.

The dosage of light can be applied in a single exposure or in multiple exposures or doses, leaving the photopolymerizable material unexposed to light between exposures. Multiple exposures of light to achieve the same total dosage can result in a surface more highly modulated than would occur from a single exposure.

The photopolymerized component 40 can be used in a number of ways. For example, it can be employed as a light diffuser in a projection viewing screen or as a component in a liquid crystal display (LCD) illumination system to hide the system's structural features.

Replication of the Photocrosslinked Layer

Figure 4:
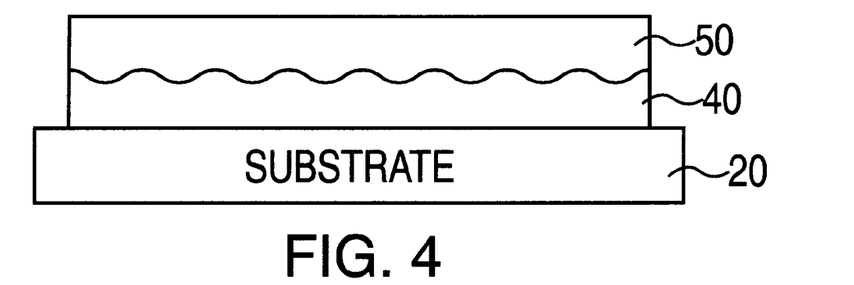
FIG. 4 is a cross-sectional diagram of the crosslinked photopolymerizable material and substrate of FIG. 3 and a conforming metallic replica layer.

A conforming metal replica layer 50 can be formed on the highly-modulated surface 42 through electroforming, electroless deposition, vapor deposition, and other techniques as will readily occur to those skilled in the art, as illustrated in FIG. 4. The metallic layer 50 is then used to make embossed copies of the surface structure of the original photocrosslinked component 40. The metallic replica layer 50 may be used in a variety of known embossing methods such as thermal embossing into clear or translucent thermoplastic materials or soft-embossing or casting (i.e., photocure embossing) into a clear or translucent photoreactive material or mixture.

Figure 5:
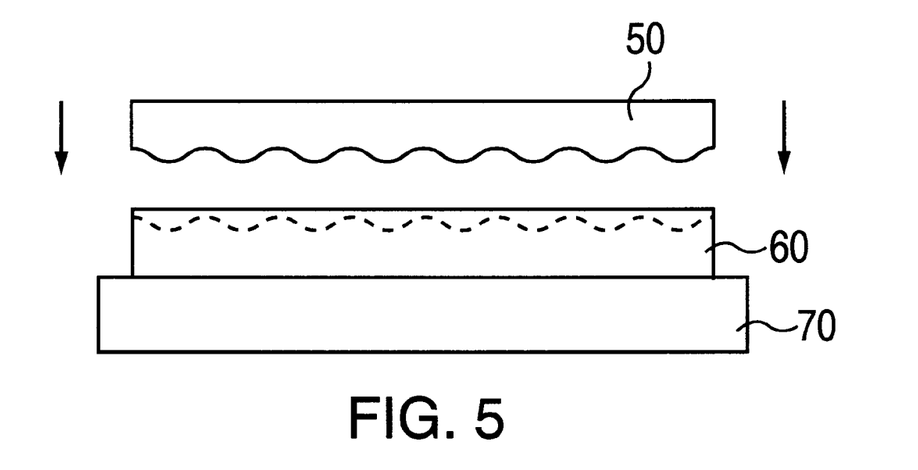
FIG. 5 is a cross-sectional diagram of the metallic replica layer of FIG. 4 being applied to a layer of embossable material residing upon a substrate.

As shown in FIG. 5, an embossable layer 60 of material, such as polycarbonate, acrylic polymer, vinyl polymer, or even photopolymerizable material, is placed on a substrate (e.g., of PET). The metallic replica layer 50 is then applied to the embossable layer 60, creating a mating surface as indicated by the dashed line 62. In the case of hard embossing or preferably thermal embossing, the metallic replica layer 50 is pushed into the surface of the embossable layer 60, simultaneously with the application of heat or pressure, or both.

In the case of soft embossing or casting, the metallic replica layer 50 is placed in contact with a reactive liquid photopolymerizable material, and the latter is then photo-exposed to form a solid polymeric film. Typically, the light used to expose the photopolymer in a soft embossing application is not collimated. Therefore, unless the embossable layer 60 was fabricated from photopolymerizable material exposed to collimated or nearly-collimated light, the embossable layer 60 will not have striations.

Figure 6:
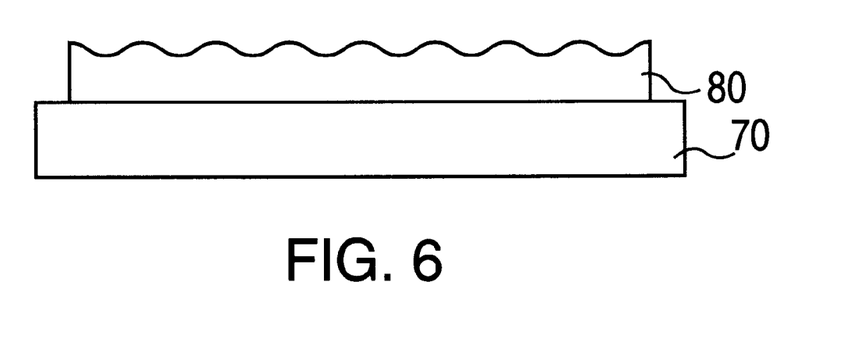
FIG. 6 is a cross-sectional diagram of the embossed layer resulting from the process depicted in FIG. 5.

By using any of the foregoing embossing techniques, a large number of pieces having the surface contour of the highly-modulated surface 42 of the original photocrosslinked component 40 can be made. The metallic replica layer 50 is removed leaving the resulting embossed layer 80 shown in FIG. 6. The embossed layer 80 may be employed as a light diffuser, with or without the underlying substrate 70.

Applying a Fill Layer

Figure 7:
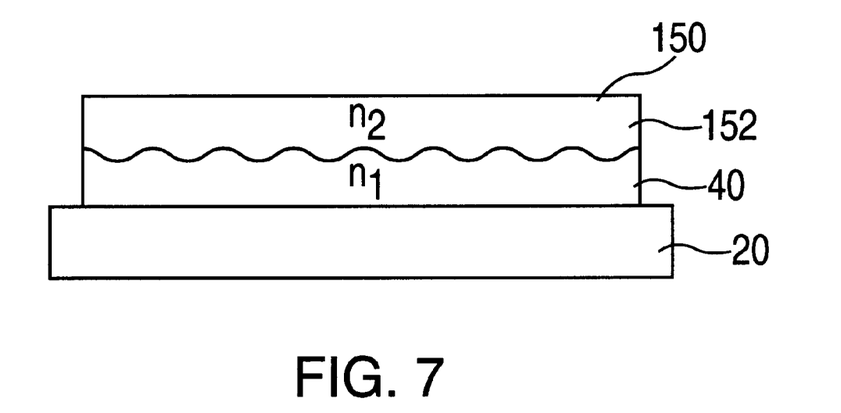
FIG. 7 is a cross-sectional diagram of the photopolymerized layer of FIG. 3 and a fill layer.

To reduce backscattering of light, the photocrosslinked component 40 of FIG. 3 can be coated with a transparent or translucent fill layer 152, as shown in FIG. 7. Similarly, as shown in FIG. 8, the fill layer 152 could be applied to the embossed layer 80 of FIG. 6.

The index of refraction $n_2$ of the fill layer 152 may differ from the index $n_1$ of the photocrosslinked component 40. For example, if $n_1=1.55$, then $n_2$ may range from about 1.30 to about 1.52, or from about 1.58 to about 1.80. The optimal refractive index is a function of the desired distribution of the light exiting the diffuser 150, i.e., for a given value for $n_1$, the diffusing light pattern obtained when light passes completely through the diffuser 150 may be varied by changing $n_2$. Of course, one may also vary $n_1$ to suit the application.

Suitable materials for the fill layer 152 having an index of refraction typically less than $n_1$ include silicone, fluorinated acrylates or methacrylates, fluoro epoxies, fluorosilicones, fluororethanes, and other materials as will readily occur to those skilled in the art. Materials such as aromatic acrylates, having an index of refraction typically greater than $n_1$, may also be employed for the fill layer 152.

Figure 8:
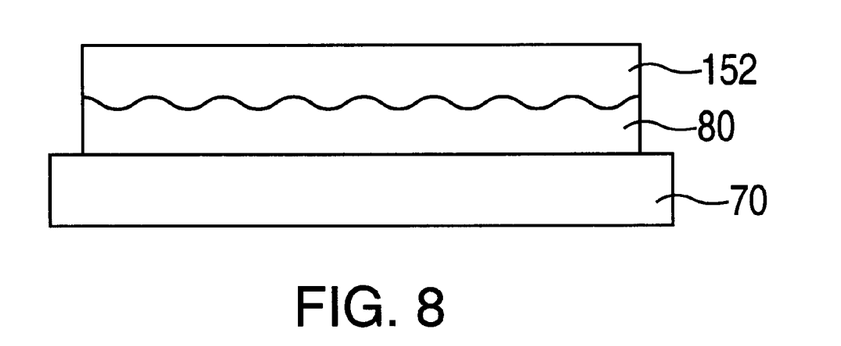
FIG. 8 is a cross-sectional diagram of the embossed layer of FIG. 6 and a fill layer.
Figure 9:
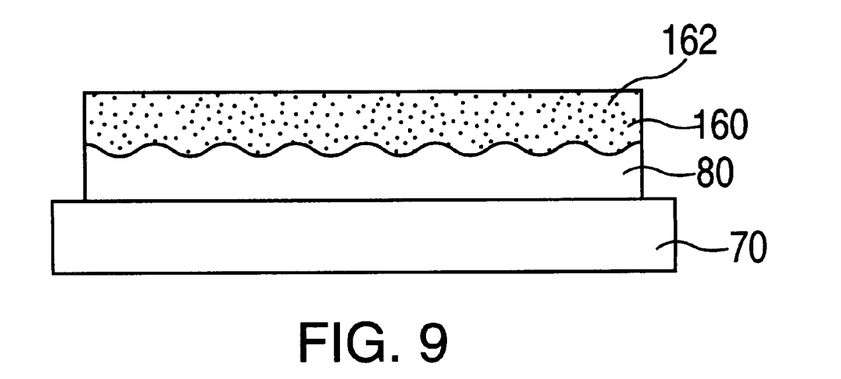
FIG. 9 is a cross-sectional diagram of the embossed layer of FIG. 6 and a fill layer containing light-scattering particles.
Figure 10:
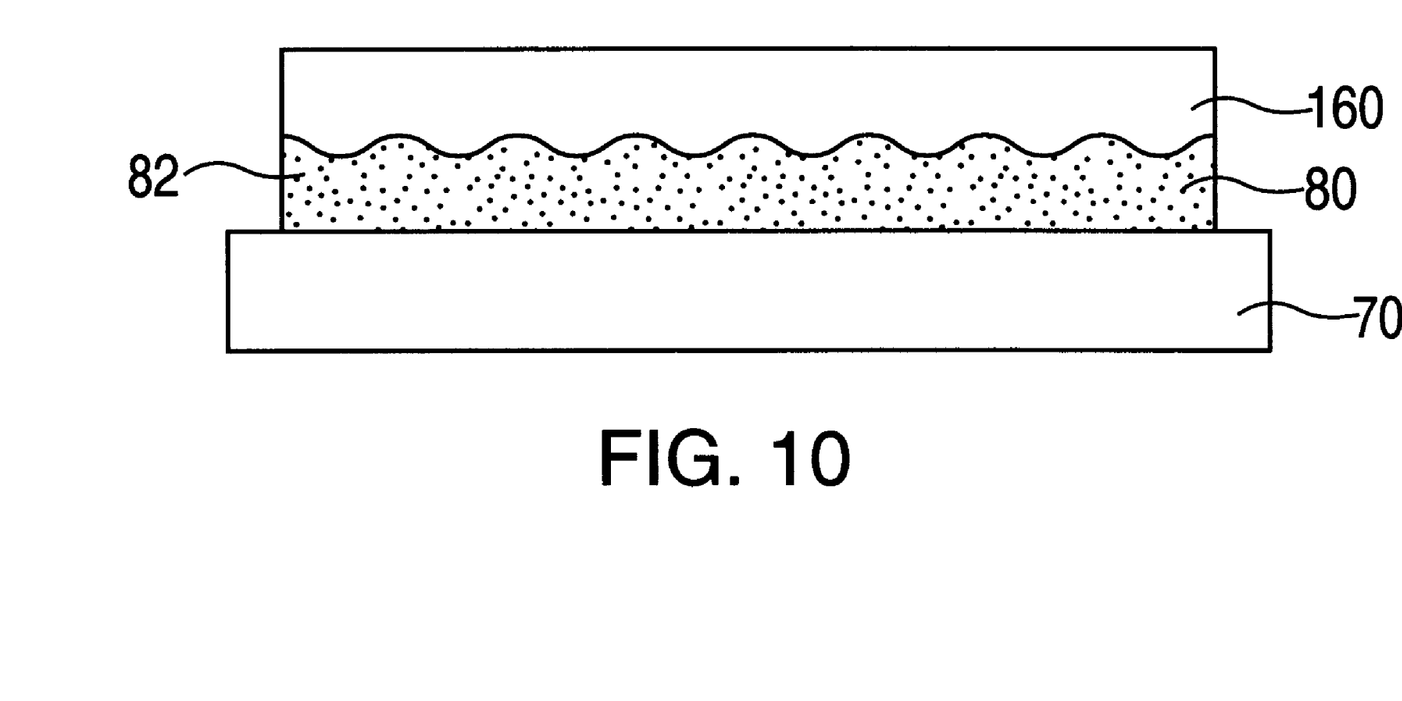
FIG. 10 is a cross-sectional diagram of the embossed layer of FIG. 6 and a fill layer, where the embossed layer contains light-scattering particles.

A variation of the arrangement of FIG. 8 is shown in FIG. 9. In lieu of an essentially homogenous material for the fill layer, a layer 160 containing light-scattering particles 162 having yet a third index of refraction $n_3$ could be utilized. Alternatively, as depicted in FIG. 10, light-scattering particles 82 could be placed in the embossable layer 60. In either case, the light-scattering particles 162 or 82 could be made from an optically-transmissive material such as glass beads or polymer beads or polymer particles made from, for example, amorphous, optically-clear polymers such as polystyrene, acrylics, polycarbonates, olefins, or other materials as will readily occur to those skilled in the art.

The various layers of the light diffusers of FIGS. 7–10, of differing indices of refraction, could be arranged with respect to the light source to alter the diffusion effect on the light. For example, light could pass through the diffuser by first passing through a layer having a higher index of refraction and then passing through a layer having a lower index of refraction, or vice versa. In addition, the reflectivity of the diffusing structures and the amount of backscattered light also can be altered by changing the direction of the light passing through the structures. Preferably, for diffuser applications demanding low backscattering of incident light (the optical loss that lowers the efficiency of the optical system), the light should pass through the layer with the lower refractive index before the higher refractive index layer.

A Liquid Crystal Display System

Figure 11:
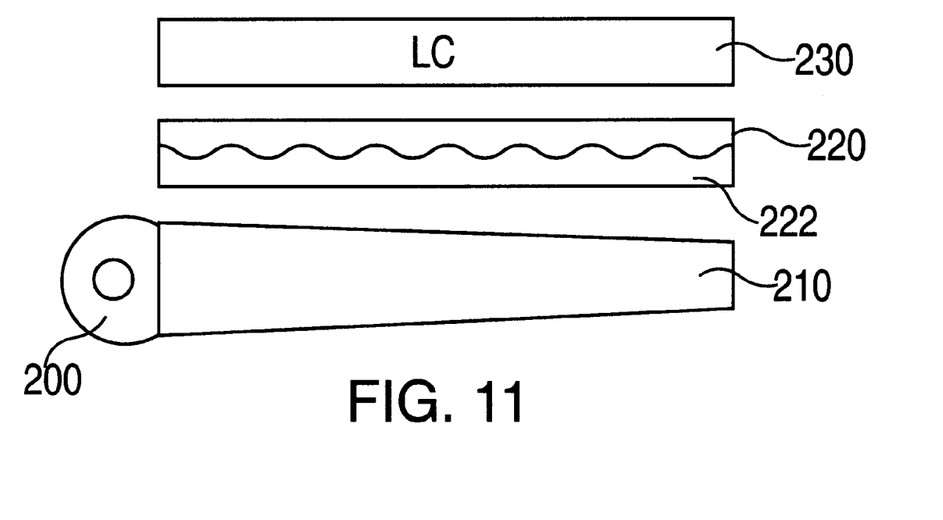
FIG. 11 is a cross-sectional diagram of a liquid crystal display system utilizing the diffusing structure of one of FIGS. 3 and 6–10.

The diffusing structures of FIGS. 3 and 6–10 could be employed in a liquid crystal display (LCD) system, as illustrated in FIG. 11. The system has a light source 200 providing light to a waveguide 210. Microstructures or scattering elements (not shown) on waveguide 210 project light out of waveguide 210 and through a diffuser 220 and a liquid crystal modulator layer 230. The diffuser 220 may have an optional transparent or translucent fill layer 222, similar to the diffusing structures of FIGS. 7–10. Preferably, the fill layer 222 has a lower refractive index than layer 220.

The diffuser 220 can perform one or more of the following functions: (a) hide the structural features of the scattering elements on the waveguide 210; (b) improve the uniformity of light transmitted from the waveguide 210 to the liquid crystal modulating layer 230; (c) define the angular distribution of light transmitted from the waveguide 210 to the liquid crystal modulating layer 230, facilitating increased brightness or the same brightness at reduced power; and optionally (d) function as a transflective diffuser, i.e., an optical device utilizing both transmitted light and reflected light. In the latter case (d), under low ambient light, the display is illuminated with the light source 200 and waveguide 210. However, in high ambient light, the light source 200 may be turned off and the display can be illuminated by sunlight that passes through liquid crystal modulating layer 230 and is reflected from the diffuser 220. It should be understood that the diffuser 220 and the fill layer 222 could be reversed with respect to the direction of light travel.

Figure 12:
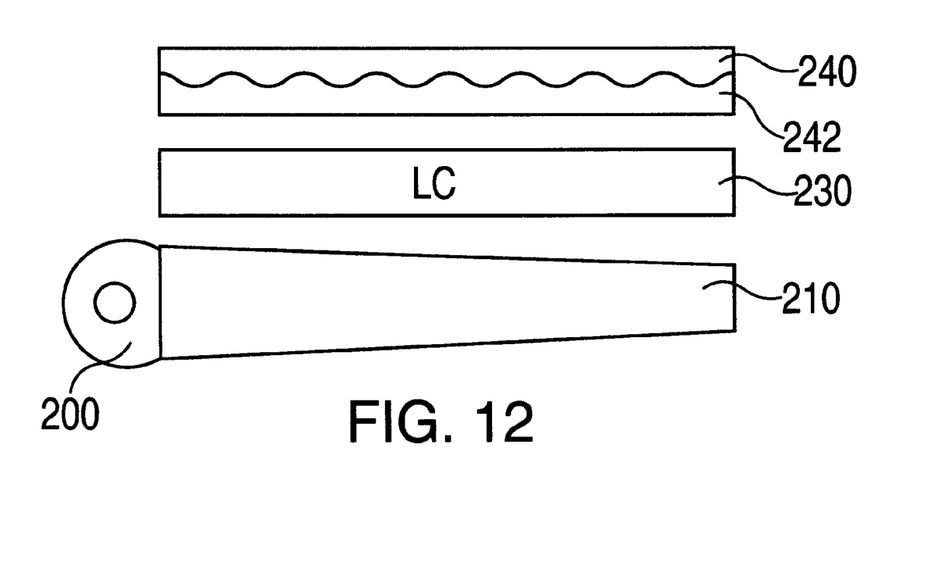
FIG. 12 is a cross-sectional diagram of an alternative liquid crystal display system utilizing the diffusing structure of one of FIGS. 3 and 6–10 as a viewing screen.

In FIG. 12, the diffusing structure is employed as a viewing screen. In this embodiment, a light source 200 provides light to a waveguide 210 having microstructures or scattering elements (not shown) that project light through a liquid crystal modulating layer 230 and then through a viewing screen 240 utilizing the one of the structures illustrated in FIGS. 3 and 6–10. The diffuser 240 may have an optional transparent or translucent fill layer 242, similar to the diffusing structures of FIGS. 7–10.

A Projection Display System

Figure 13:
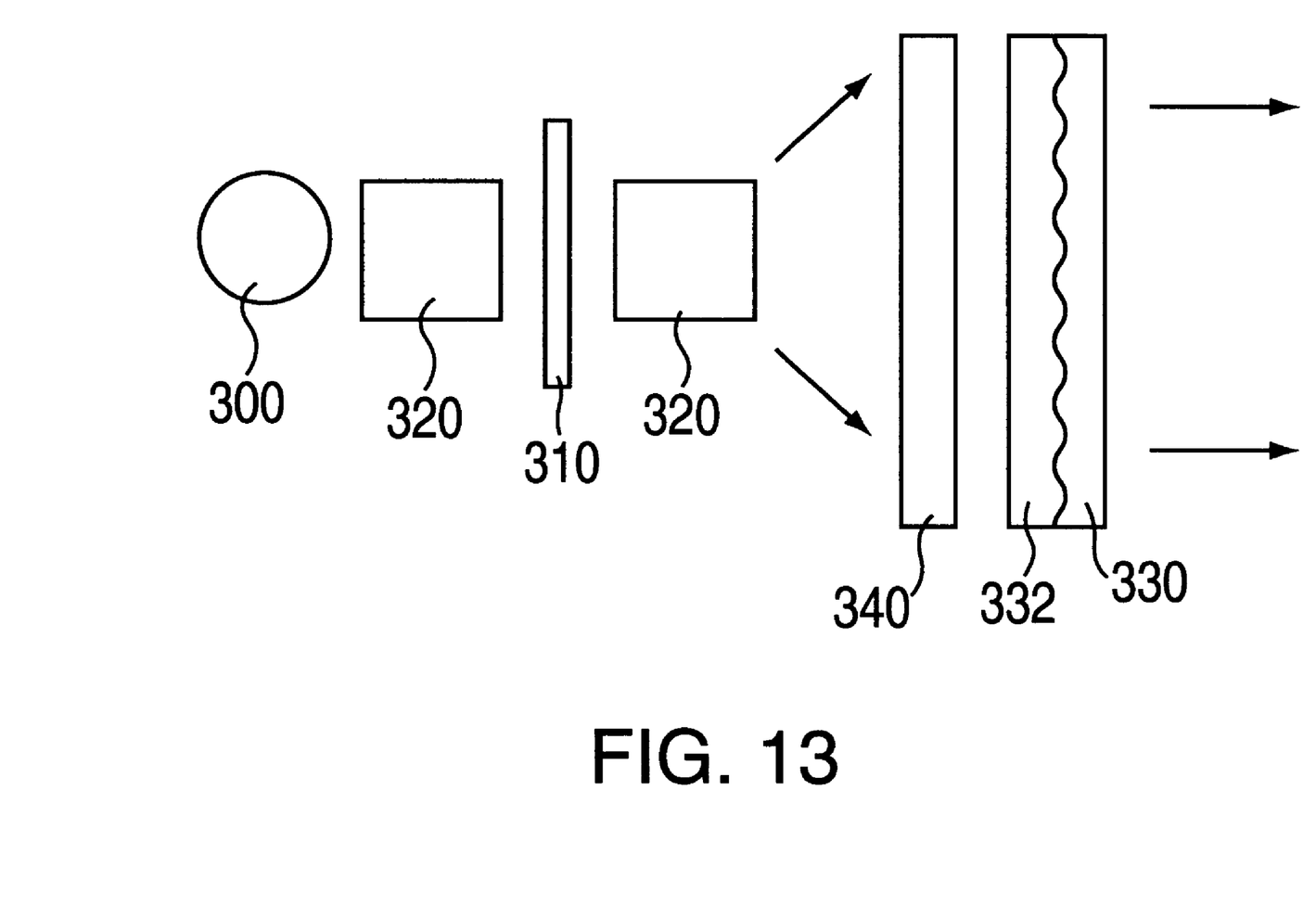
FIG. 13 is a cross-sectional diagram of a projection display system utilizing the diffusing structure of one of FIGS. 3 and 6–10 as a viewing screen.

The diffusing structures may also serve as a viewing screen in a projection display system. In FIG. 13, a light source 300 provides light to an image-forming device 310, such as a liquid crystal modulating layer. Optics 320 can be provided to focus the light from the light source 300 and to project the image created by the image-forming device 310. The image is projected onto a viewing screen 330 incorporating one of the diffusing structures of FIGS. 3 and 6–10, optionally with a transparent or translucent fill layer 332. Optionally, a Fresnel lens 340 can be placed before the viewing screen 330.

A Diffusing Structure with Tapered Optical Waveguides

The diffusing structures of this invention discussed thus far may be combined with other optical structures to form multiple-layer, light-transmitting viewing screens. For example, the diffusers of FIGS. 3 and 6–10 may be combined with an array of tapered-optical waveguides, by juxtaposing a diffusing structure with an array. Examples of arrays of tapered optical waveguides are shown in FIGS. 14–22.

The cross-section of a tapered optical waveguide may assume any shape including a square, a rectangle, a polygon, a circle, or an oval. Alternatively, the waveguide could be a lenticular structure tapered in one direction and extending across the viewing screen in the perpendicular direction and having for example a rectangular cross section, as discussed below. Typical structures for arrays of tapered optical waveguides are discussed in detail in U.S. Pat. No. 5,462,700 and U.S. Pat. No. 5,481,385 cited above.

Figure 14:
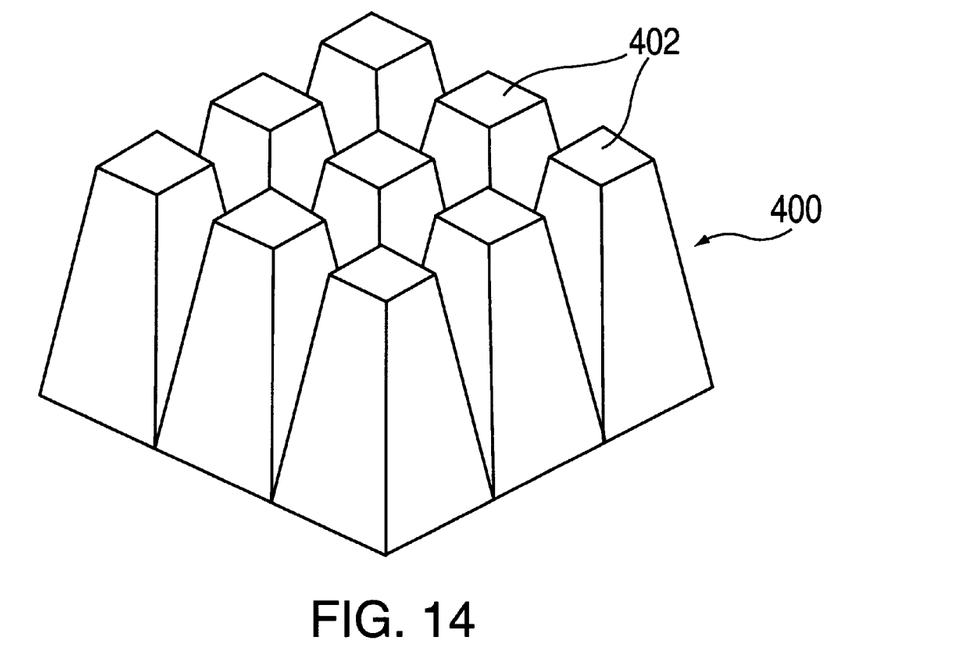
FIGS. 14 and 15 are perspective and cross-sectional diagrams, respectively, of an array of tapered optical waveguides.
Figure 15:
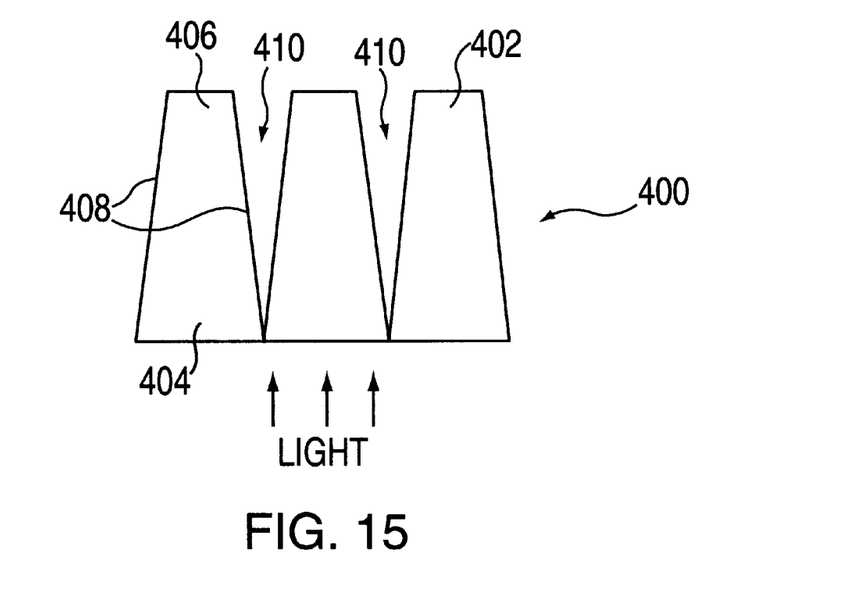

FIGS. 14 and 15 are perspective and elevation views, respectively, of an array 400 of tapered optical waveguides where each waveguide has a square cross-section. Each tapered optical waveguide 402 has an input surface 404, an output surface 406 having an area less than the input surface 404, and sidewalls 408. Preferably, the interstitial regions 410 between the waveguides 402 are filled with an absorbing material having a refractive index lower than the refractive index of waveguides 402.

The angular distribution of light leaving the waveguides can be altered by varying the relative dimensions and geometry of the waveguides, as discussed in the cited patents. Some of the light transmitted by the tapered optical waveguides 402 will undergo total internal reflection from the sidewalls 408 and then exit the tapered optical waveguides 402 at angles larger than the input angle. The shape of the tapered optical waveguides 402 and the refractive index difference between the tapered optical waveguides 402 and the interstitial regions 410 can be chosen such that light entering the tapered optical waveguides 402 at angles greater than the critical angle will intersect the sidewalls 408 at angles that will not support total internal reflection. That light will pass through the sidewalls 408 and be absorbed by the absorbing material in the interstitial regions 410.

Figure 16:
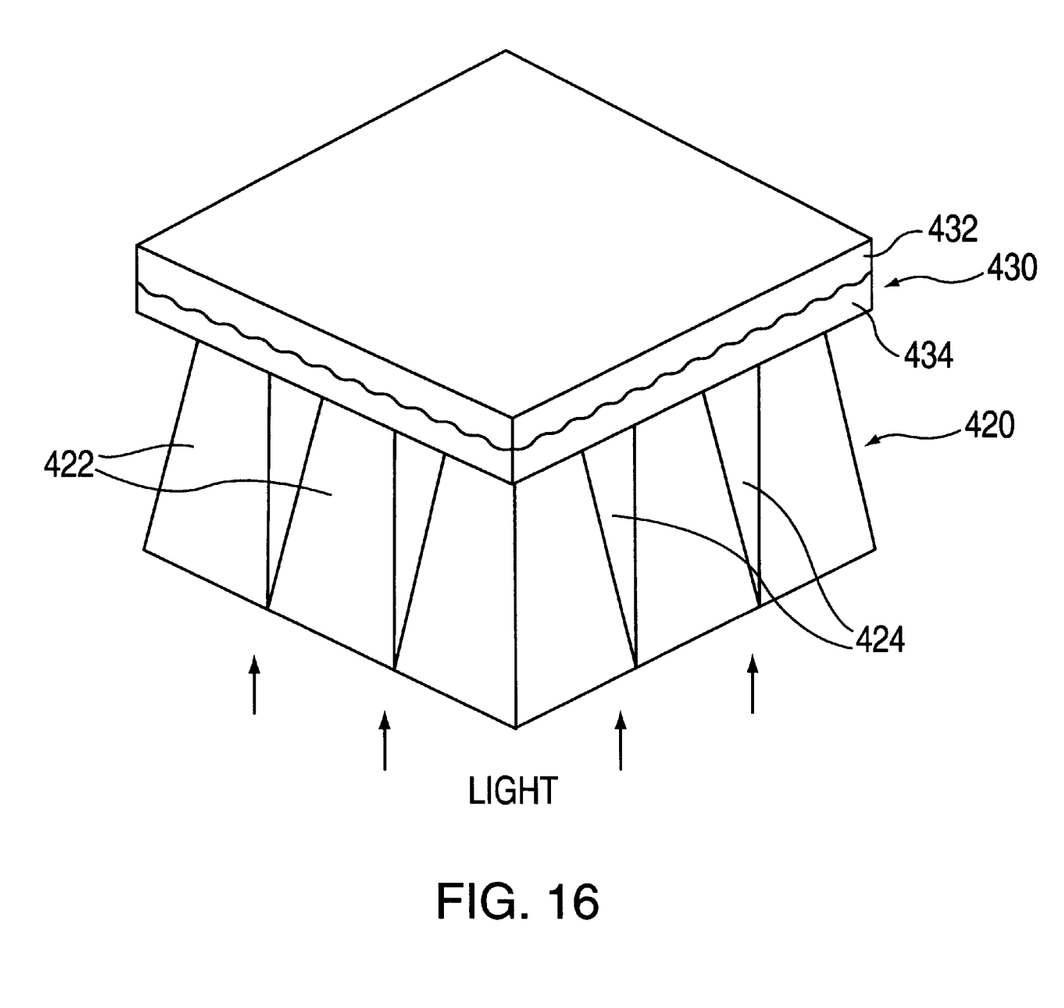
FIG. 16 is a perspective diagram of a viewing screen utilizing the diffusing structure of one of FIGS. 3 and 6–10 with an optional fill layer and an array of tapered optical waveguides.

An arrangement combining a diffuser utilizing one of the structures of FIGS. 3 and 6–10 with an array of tapered optical waveguides is shown in FIG. 16. Light first enters an array 420 of tapered optical waveguides 422 and then passes through a diffusing structure 430, having a diffuser 432 and a fill layer 434, which acts as a viewing screen. Preferably, the refractive index of the fill layer 434 is less than that of the waveguides 422 and the interstitial regions 424 are filled with an absorbing material having an index of refraction also less than that of than the index of refraction of the waveguides 422.

Figure 17:
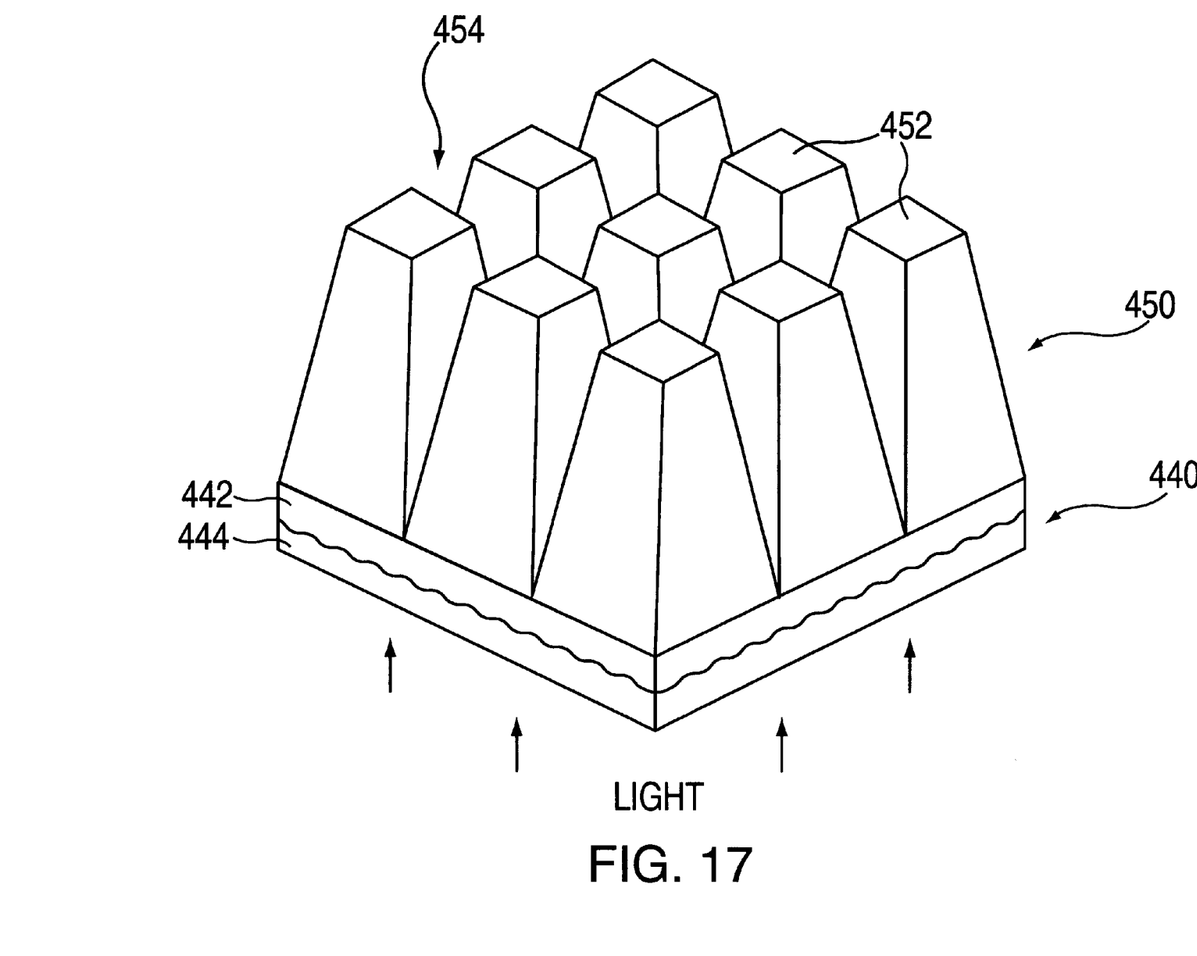
FIG. 17 is a perspective diagram of an alternative viewing screen utilizing the diffusing structure of one of FIGS. 3 and 6–10 with an optional fill layer and an array of tapered optical waveguides.

An alternative configuration of the arrangement of FIG. 16 is illustrated in FIG. 17. There, light first enters a diffusing structure 440, having a diffuser 442 and a fill layer 444, and then an array 450 of tapered optical waveguides 452. Preferably, the diffuser 442 utilizes one of the diffusing structures of FIGS. 3 and 6–10 and the interstitial regions 454 are filled with an absorbing material having an index of refraction also less than that of the waveguides 452.

An Arrangement Utilizing Lenticular Waveguides

The diffusing structures of FIGS. 3 and 6–10 may be combined with other types of optical structures such as, for example, arrays of tapered optical waveguides in which the output surface area of each tapered optical waveguide is less than the input surface area of each waveguide. Included within the class of tapered optical waveguides are arrays of lenticular tapered optical waveguides tapered only along one axis and which extend across the planar optical device in the perpendicular direction. Also included are stacked layers of tapered optical waveguide arrays.

Figure 18:
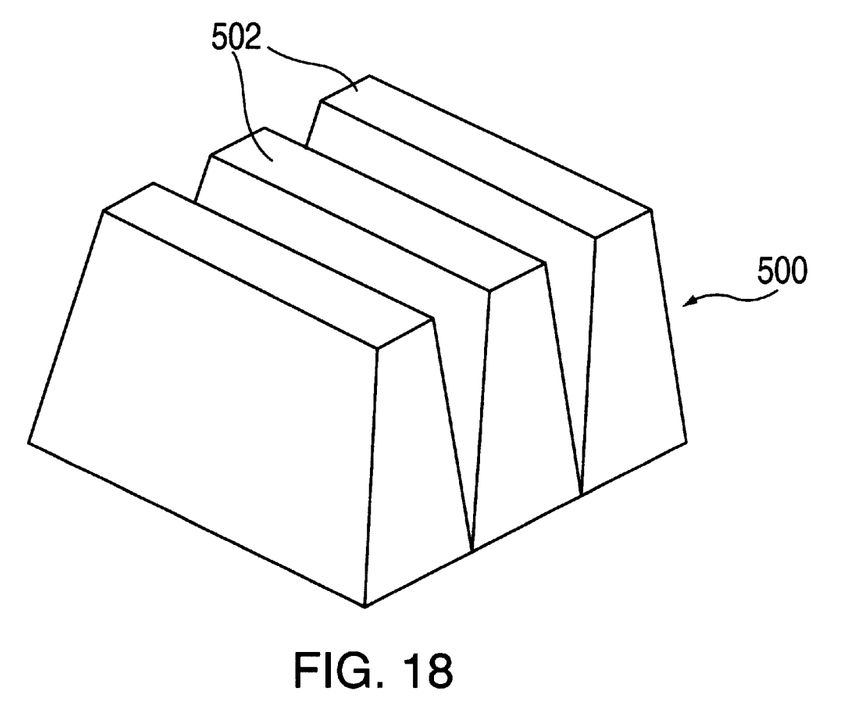
FIGS. 18 and 19 are perspective and cross-sectional diagrams, respectively, of an array of tapered, lenticular optical waveguides.
Figure 19:
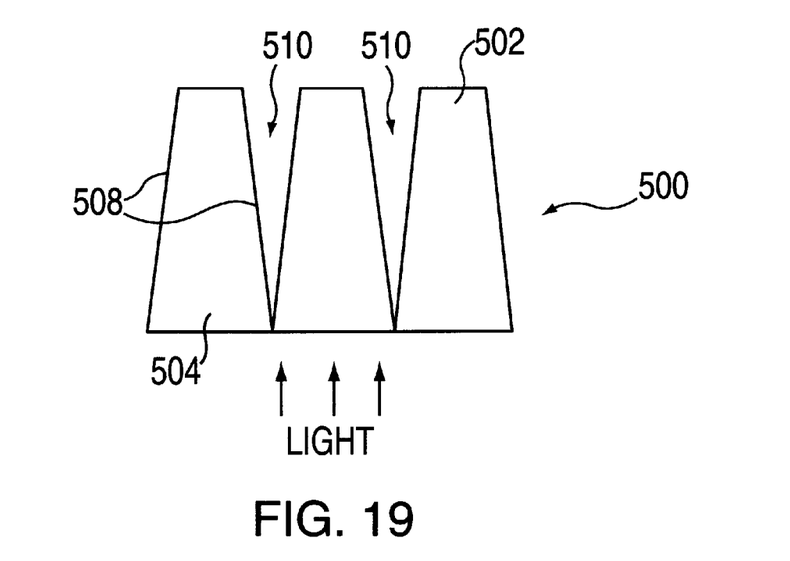

FIGS. 18 and 19 are perspective and elevation views, respectively, of an array 500 of tapered optical waveguides having a lenticular structure. Each lenticular tapered optical waveguide 502 has an input surface 504, an output surface 506 having an area less than the input surface 504, and sidewalls 508. Preferably, the interstitial regions 510 between lenticular waveguides 502 are filled with an absorbing material having a refractive index less than that of the waveguides 502. The discussion regarding angular distribution and critical angle with respect to the tapered optical waveguides 402 applies equally to the lenticular tapered optical waveguides 502.

Figure 20:
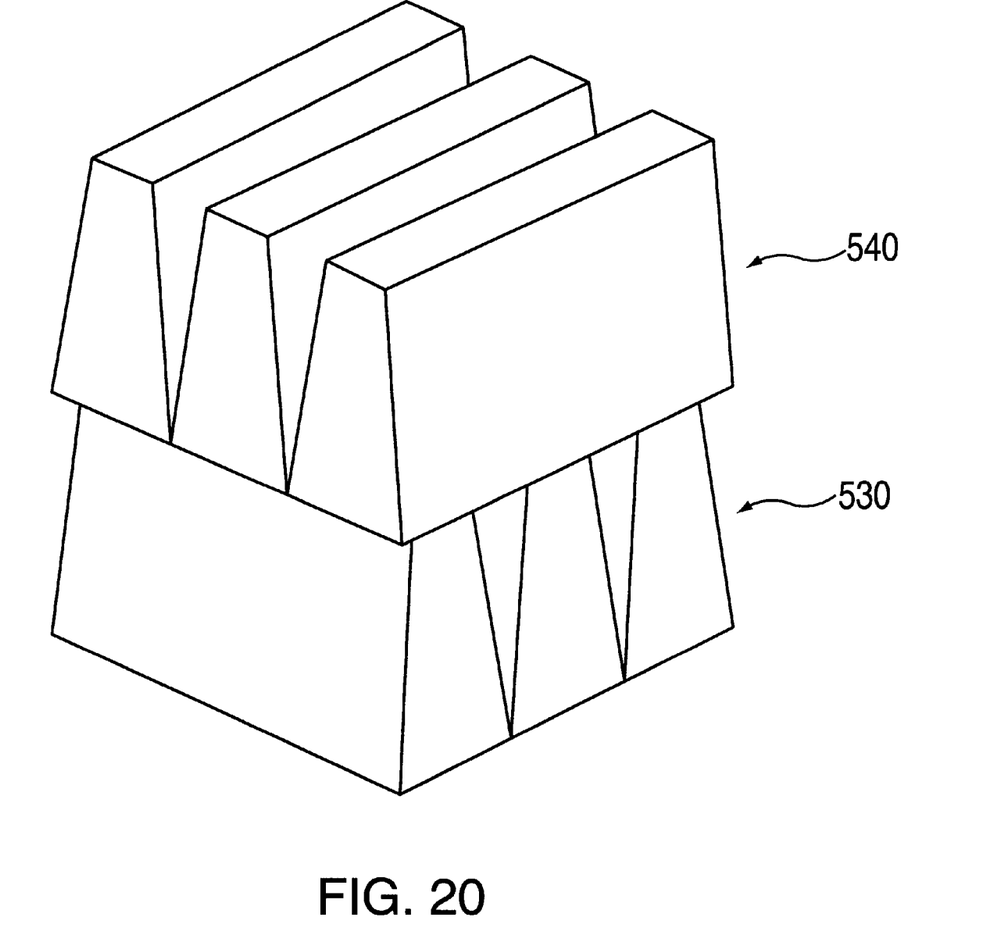
FIG. 20 is a perspective diagram of a stack of two arrays of tapered, lenticular optical waveguides.

Two or more arrays of lenticular tapered optical waveguides can be stacked in layers, where the lenticular features of one layer 530 are oriented at an angle with respect to the lenticular features of the second layer 540, as shown in FIG. 20. Although the angular offset shown in FIG. 20 is 90°, another angle more suitable to the application could be selected.

Figure 21:
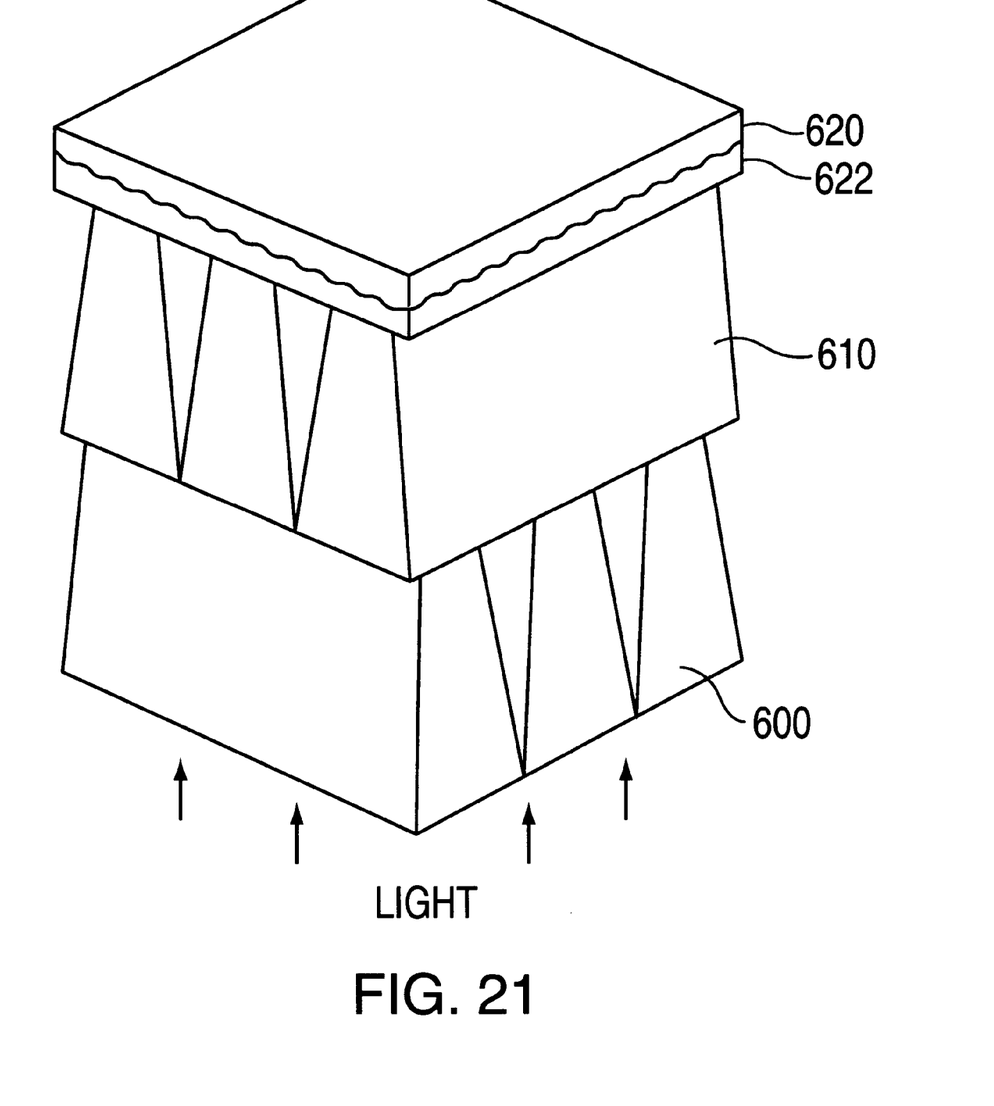
FIG. 21 is a perspective diagram of a viewing screen utilizing the diffusing structure of one of FIGS. 3 and 6–10 with an optional fill layer and a stack of two arrays of tapered, lenticular optical waveguides.
Figure 22:
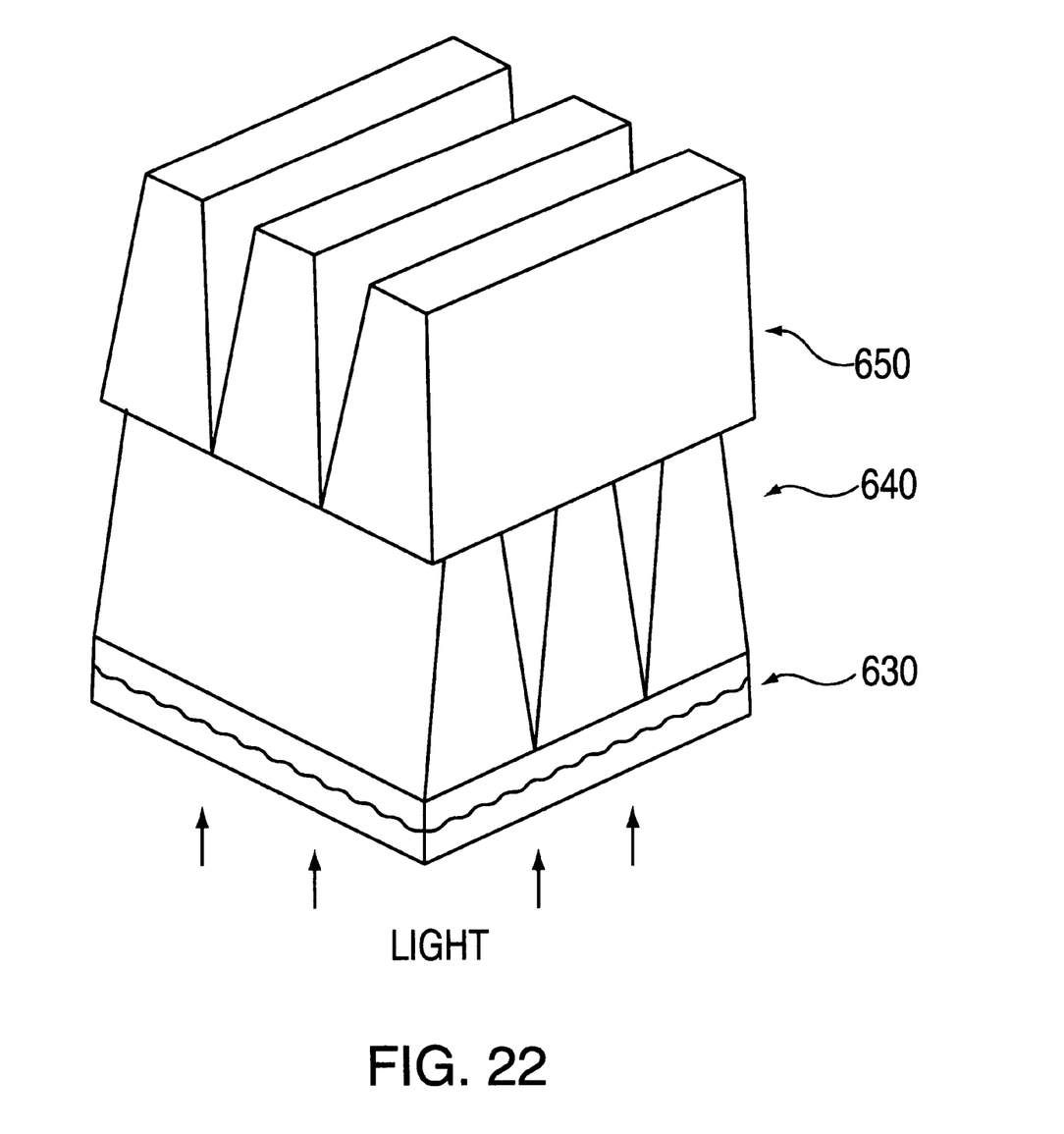
FIG. 22 is a perspective diagram of an alternative viewing screen utilizing the diffusing structure of one of FIGS. 3 and 6–10 with an optional fill layer and a stack of two arrays of tapered, lenticular optical waveguides.

The structure of FIG. 20 may be combined with one of the diffusing structures of FIGS. 3 and 6–10, as shown in FIG. 21. Light passes first through the lenticular waveguide arrays 600 and 610, and then through the diffuser 620. Again, the diffuser 620 has a fill layer 622 that preferably has a lower index of refraction with respect to the waveguide arrays 600 and 610. Alternatively, as illustrated in FIG. 22, the diffuser 630 can be placed ahead of the waveguide arrays 640 and 650.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A process for manufacturing a light diffusing structure, comprising the step of directing collimated or nearly-collimated light through a transparent or translucent substrate and into a layer of photopolymerizable material comprising a photopolymerizable component, a photoinitiator and a photoinhibitor, which layer has a bottom surface, adjacent to the substrate and a top surface, wherein said light is directed through the bottom surface toward the top surface for a period of time sufficient to photopolymerize only a portion of the photopolymerizable material to thereby form a lower photopolymerized portion said lower photopolymerized portion having a uniform thickness beneath a highly modulated surface in said layer of photopolymerizable material and an upper unphotopolymerized portion and thereafter removing the upper unphotopolymerized portion and not removing the lower photopolymerized portion.

2. The process as set forth in claim 1, wherein the substrate comprises a material selected from the group consisting of (a) amorphous materials; (b) semi-crystalline materials that contain crystalline domains interspersed in an amorphous matrix; and (c) purely crystalline materials.

3. The process as set forth in claim 1, further comprising the step of fabricating the photopolymerizable component from at least one photopolymerizable monomer or oligomer.

4. A process as set forth in claim 1, further comprising the step of placing the layer of photopolymerizable material on the substrate.

5. The process as set forth in claim 1, wherein the light has a divergence angle of less than ten degrees.

6. A process as set forth in claim 1, further comprising the step of directing the light through the substrate in more than one dose.

7. A process as set forth in claim 1, further comprising the step of removing the photopolymerized portion of the photopolymerizable material from the substrate.

8. A process as forth in claim 1, further comprising the step of:

placing transparent or translucent fill material on the surface of the photopolymerized photopolymerizable material.

9. A process as forth in claim 8, wherein the step of placing transparent or translucent fill material on the surface of the photopolymerized photopolymerizable material comprises the step of selecting a fill material having an index of refraction less than that of the polymerized material.

10. A process as set forth in claim 8, further comprising the step of placing light-scattering particles in the fill material.

11. A process as set forth in claim 1, further comprising the step of combining the photopolymerized photopolymerizable material with an array of tapered optical waveguides, each tapered optical waveguide comprising:

an input surface that admits light;

an output surface distal from the input surface, the output surface having a surface area less than that of the input surface; and a sidewall or sidewalls disposed between the input and output surfaces for effecting total reflection of the light rays received by the input surface.

12. A process as set forth in claim 11, where the step of combining the photopolymerized photopolymerizable material with an array of tapered optical waveguides comprises the step of placing the photopolymerized photopolymerizable material in juxtaposition to the input or the output surface of the tapered optical waveguides.

13. A process as set forth in claim 11, where the tapered optical waveguides are lenticular.

14. A process as set forth in claim 1, further comprising the steps of:

forming a metallic layer on the surface of the photopolymerized photopolymerizable material to form a conforming replica layer; and applying the metallic replica layer to embossible material.

15. A process as set forth in claim 14, further comprising the step of placing light-scattering particles in the embossable material.

16. A process as set forth in claim 14, further comprising the step of combining the embossable material to which the metallic replica layer has been applied with an array of tapered optical waveguides, each tapered optical waveguide comprising:

an input surface that admits light;

an output surface distal from the input surface, the output surface having a surface area less than that of the input surface; and a sidewall or sidewalls disposed between the input and output surfaces for effecting total reflection of the light rays received by the input surface.

17. A process as set forth in claim 16, where the step of combining the embossable material with an array of tapered optical waveguides comprises the step of placing the photopolymerized photopolymerizable material in juxtaposition to the input or the output surface of the tapered optical waveguides.

18. A process as set forth in claim 16, where the tapered optical waveguides are lenticular.

19. A process as set forth in claim 1, wherein said photopolymerized portion has a surface having smooth bumps ranging from about 1 micron to about 20 microns in both height and width.

20. A process as set forth in claim 1, wherein said photoinhibitor comprises oxygen.

21. A process for manufacturing a light diffusing structure, comprising the steps of:

selecting a transparent or translucent substrate from a material from one or more of the classes of (a) amorphous materials; (b) semi-crystalline materials that contain crystalline domains interspersed in an amorphous matrix; and (c) purely crystalline materials, the substrate having first and second surfaces generally flat and parallel to each other;

depositing a layer of photopolymerizable material comprising at least one photopolymerizable monomer or oligomer, a photoinitiator and a photoinhibitor, on the first surface of the substrate;

directing collimated or nearly-collimated light through the second surface of the substrate and into the layer of said photopolymerizable material, which layer has a bottom surface adjacent to the substrate and a top surface wherein said light is directed through the bottom surface toward the top surface for a period of time sufficient to photopolymerize only a portion of the photopolymerizable material to thereby form a lower photopolymerized portion portion said lower photopolymerized portion having a uniform thickness beneath a highly modulated surface in said layer of photopolymerizable material and an upper unphotopolymerized portion; and removing the upper unphotopolymerized portion and not removing the lower photopolymerized portion.

22. A process as set forth in claim 21, wherein said photoinhibitor comprises oxygen.

* * * * *